United States Patent [19]
Harano

[11] Patent Number: 6,094,583
[45] Date of Patent: Jul. 25, 2000

[54] PAGING SYSTEM ADAPTED TO BE CALLED FROM CORDLESS TELEPHONE

[75] Inventor: Nobuya Harano, Tokyo, Japan

[73] Assignee: NEC Corporation, Tokyo, Japan

[21] Appl. No.: 08/655,405

[22] Filed: May 30, 1996

[30] Foreign Application Priority Data

May 30, 1995 [JP] Japan ..................................... 7-132112

[51] Int. Cl.[7] .................................................. H04Q 7/26
[52] U.S. Cl. ........................ 455/462; 455/31.2; 455/38.1; 340/825.44
[58] Field of Search .................................. 455/31.2, 31.3, 455/11.1, 454, 462–4, 458, 426, 38.1, 0.2, 0.4; 340/825.44

[56] References Cited

U.S. PATENT DOCUMENTS

| | | | |
|---|---|---|---|
| 3,976,995 | 8/1976 | Sebestyen | 340/337 |
| 5,040,204 | 8/1991 | Sasaki et al. | 379/61 |
| 5,428,666 | 6/1995 | Fyfe et al. | 379/58 |

FOREIGN PATENT DOCUMENTS

| | | |
|---|---|---|
| 0212761 | 3/1987 | European Pat. Off. . |
| 0263666 | 4/1988 | European Pat. Off. . |
| 0369123 | 9/1989 | European Pat. Off. . |
| 0478213 | 9/1991 | European Pat. Off. . |

*Primary Examiner*—Fan Tsang
*Assistant Examiner*—Philip J. Sobutka
*Attorney, Agent, or Firm*—Ostrolenk, Faber, Gerb & Soffen, LLP

[57] ABSTRACT

It is an object of the invention to allow a user to call a radio selective calling receiver (pager) near a room or house within a range of several hundred meters from a cordless telephone master or subsidiary unit without using a general public telephone line and without being charged for the call. The paging system includes a pager, and a cordless telephone master and subsidiary units capable of calling the pager.

7 Claims, 8 Drawing Sheets

PAGING SYSTEM ADAPTED TO BE CALLED FROM CORDLESS TELEPHONE

BACKGROUND OF THE INVENTION

1. Field of the Invention

The present invention relates to a radio selective calling receiver and a cordless telephone system and, more particularly, to a radio selective calling receiver (such as a pager) adapted to be called from a cordless telephone without using the public telephone line.

2. Description of the Prior Art

Recently, mobile communication is becoming increasingly popular, and various means for calling a moving person have been developed. For example, with respect to a radio selective calling receiver, the person carrying the receiver can be called through a general public telephone line.

A cordless telephone system comprises a master unit and one or more subsidiary units. The master unit can call the subsidiary unit, or a subsidiary unit can call another subsidiary unit.

However, with the conventional radio selective calling receiver, the general public telephone line must be used to call the person carrying the receiver. Therefore, even when the person to be called is in the vicinity of the caller, the caller is charged for every calling operation.

When the person to be called always carries a subsidiary unit of the cordless telephone system, the user can call this person without being charged for the call as long as this person is within the area covered by the cordless telephone system. However, the subsidiary unit is larger in both size and weight than the radio selective calling receiver, e.g., weighs several hundred grams, resulting in poor portability.

SUMMARY OF THE INVENTION

The present invention has been made in consideration of the above situation, and has as its object to provide a compact and light-weight paging system with high portability, which prevents a user from being charged for a call operation originated by a person in the vicinity of the user.

In order to achieve the above object, according to the present invention, there is provided a paging system comprising a radio selective calling receiver which can be called directly from a cordless telephone master unit or a subsidiary unit using a paging frequency band and without using a telephone line, and a cordless telephone capable of transmitting a signal to the receiver in the paging frequency band. According to the present invention, a cordless selective call number for each radio selective calling receiver is transmitted in accordance with a prescribed signal format. In this operation, as in the normal calling operation of the radio selective calling receiver, the selective call number and a message signal can be received.

According to the present invention the user of the cordless system can call a radio selective calling receiver which is within the range of several hundred meters from the cordless telephone master or subsidiary unit without using the general public telephone line. Therefore, a person who always carries the light-weight radio selective calling receiver can be reached using a cordless system without a charge being assessed for the call.

DETAILED DESCRIPTION OF THE PREFERRED EMBODIMENT

The embodiment of the present invention will now be described below.

Figure 1:
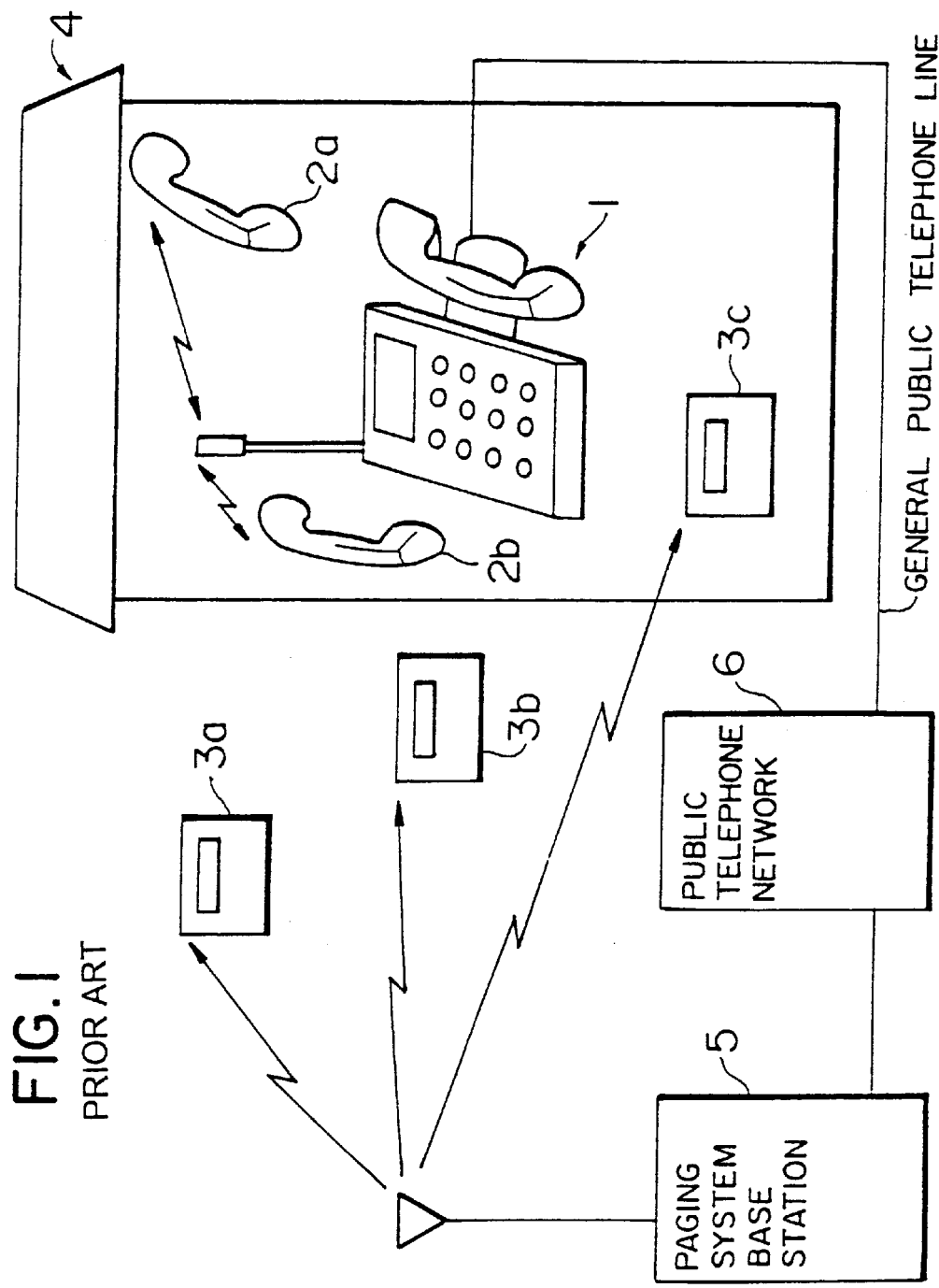
FIG. 1 is a view showing a conventional system configuration.

FIG. 1 is a view showing a conventional configuration of a cordless telephone and paging terminals.

A cordless telephone master unit 1 has a normal function of speech communication using a general public telephone line and a function of speech communication with a cordless telephone subsidiary unit. Cordless telephone subsidiary units 2a and 2b have a function of speech communication using the general telephone line through the master unit, the function of speech communication with the master unit, and an inter-subsidiary-unit speech communication function. Pagers (radio selective calling receivers) 3a to 3c can be called through the general public telephone line. Reference numeral 4 denotes a house.

In this prior art arrangement, to call one of the pagers 3a to 3c from the cordless telephone master unit 1 or the subsidiary unit 2a or 2b, a selective call number for the pager is transmitted through the general public telephone line to a paging system base station 5, causing a radio signal to be transmitted from the paging system base station 5 so that the pager receivers a tone-only signal or a signal including a message.

Figure 2:
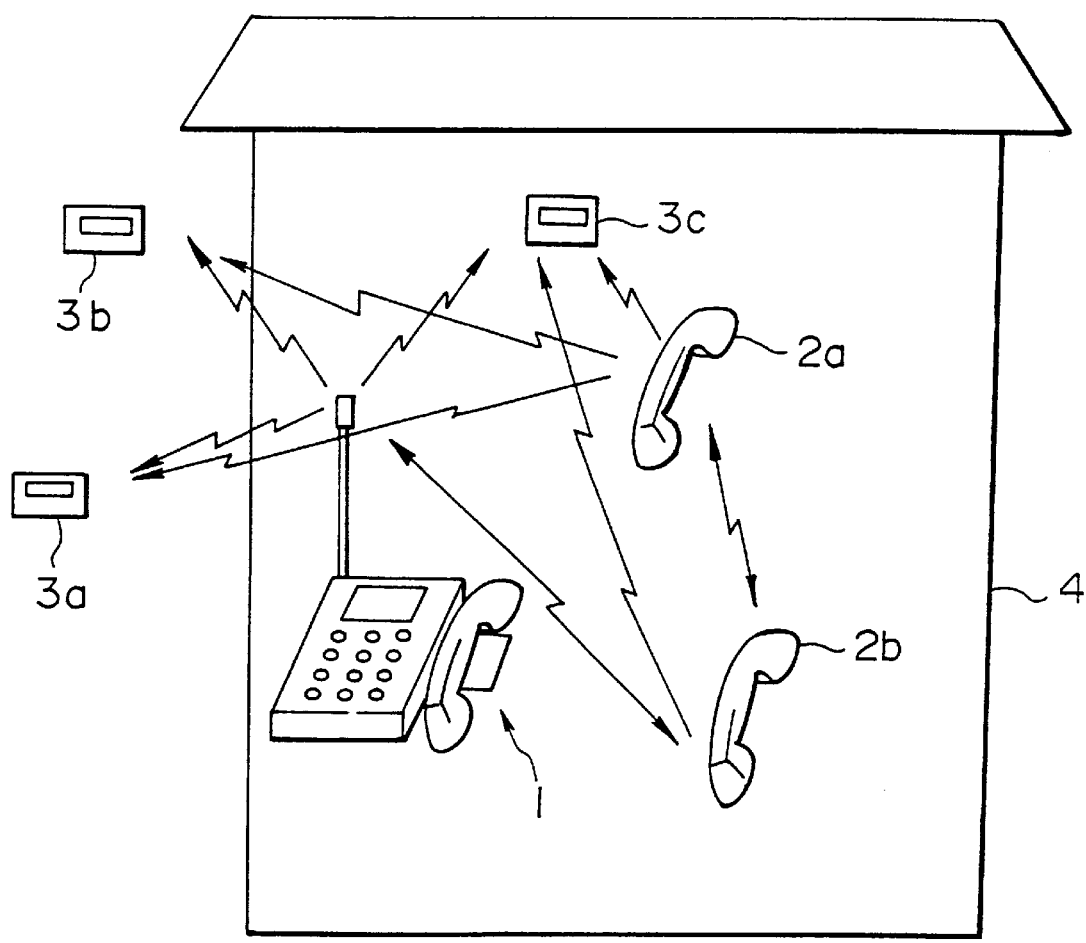
FIG. 2 is a view showing an example of the system configuration of the present invention.

FIG. 2 is a view showing an example of the configuration of the present invention.

In the arrangement in order, of FIG. 2 to call one of the pagers 3a to 3c near the house 4, the master unit 1 and subsidiary units 2a and 2b include a transmission function which allows transmission of the selective call number for the cordless telephone using a frequency corresponding to the receiver in accordance with a transmission protocol corresponding to the paging terminal. The selective call number registered in the corresponding one of the pagers 3a to 3c and an arbitrary message signal (unnecessary for a tone-only signal) are transmitted. In this operation, the pager 3a, 3b, or 3c near the house 4 can be called without using the general telephone line.

Figure 3:
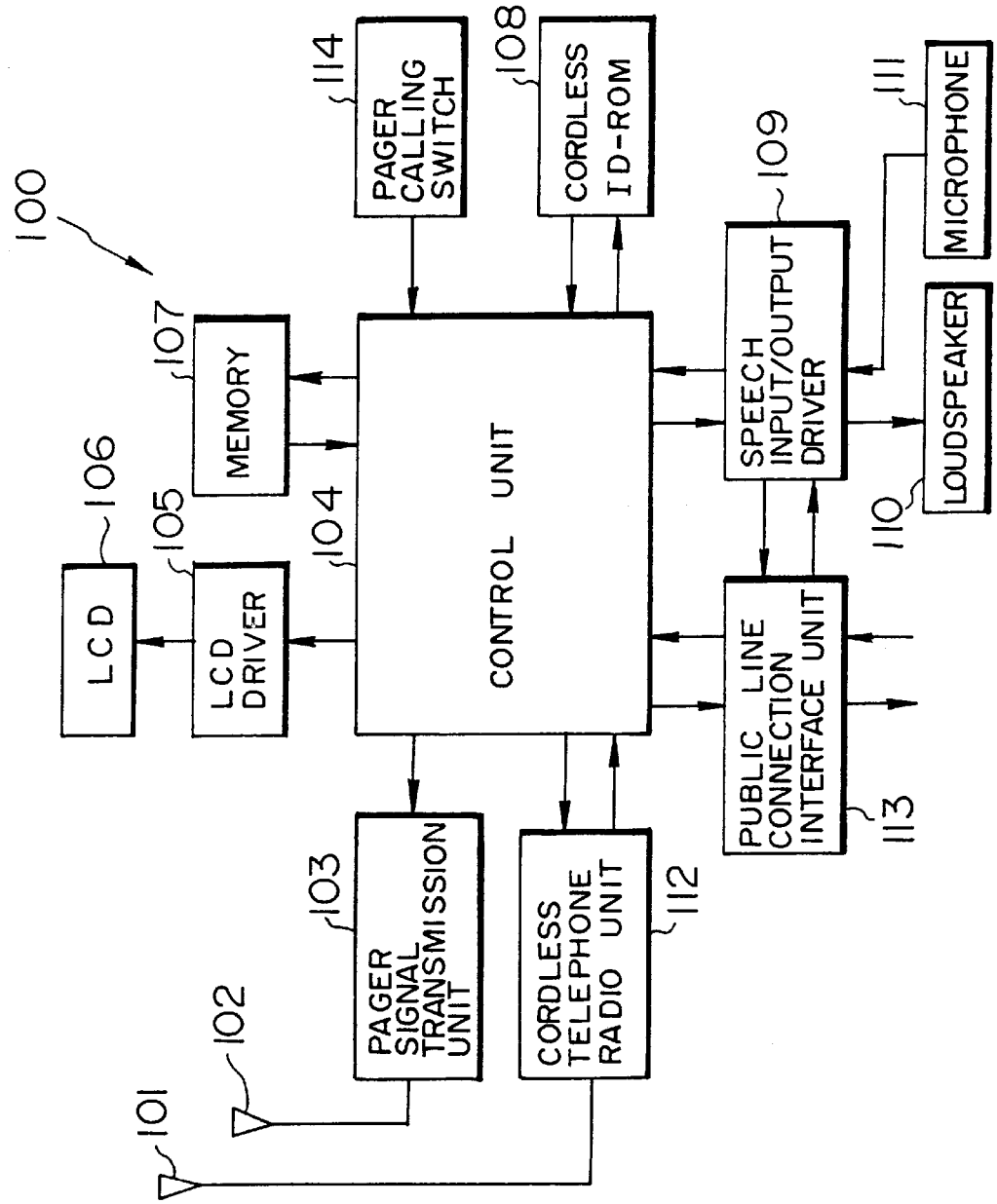
FIG. 3 is a block diagram showing an example of the internal arrangement of a cordless telephone master unit of the present invention.

FIG. 3 is a block diagram showing an example of the internal arrangement of a cordless telephone master unit of the present invention.

Figure 4:
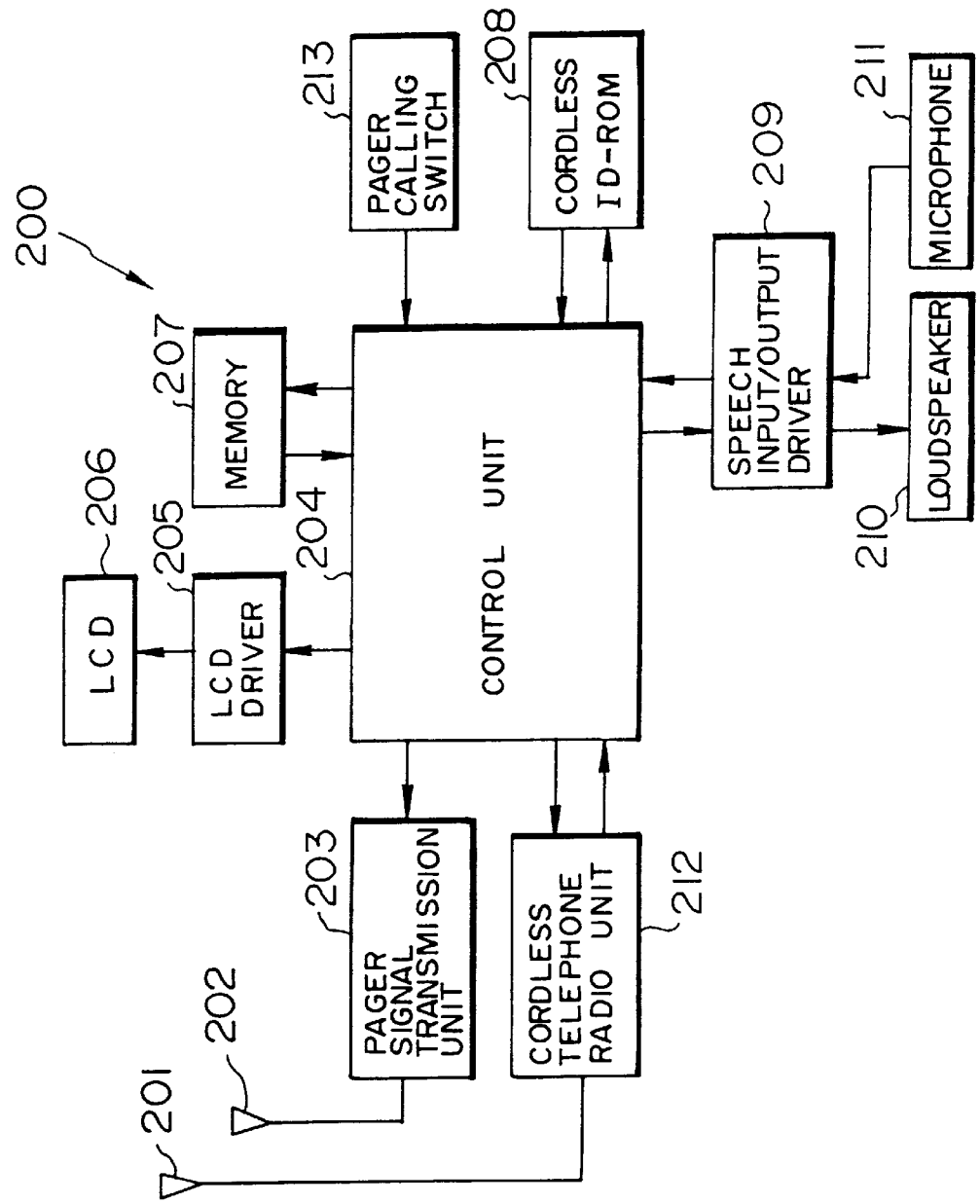
FIG. 4 is a block diagram showing an example of the internal arrangement of a cordless telephone subsidiary unit of the present invention.
Figure 5:
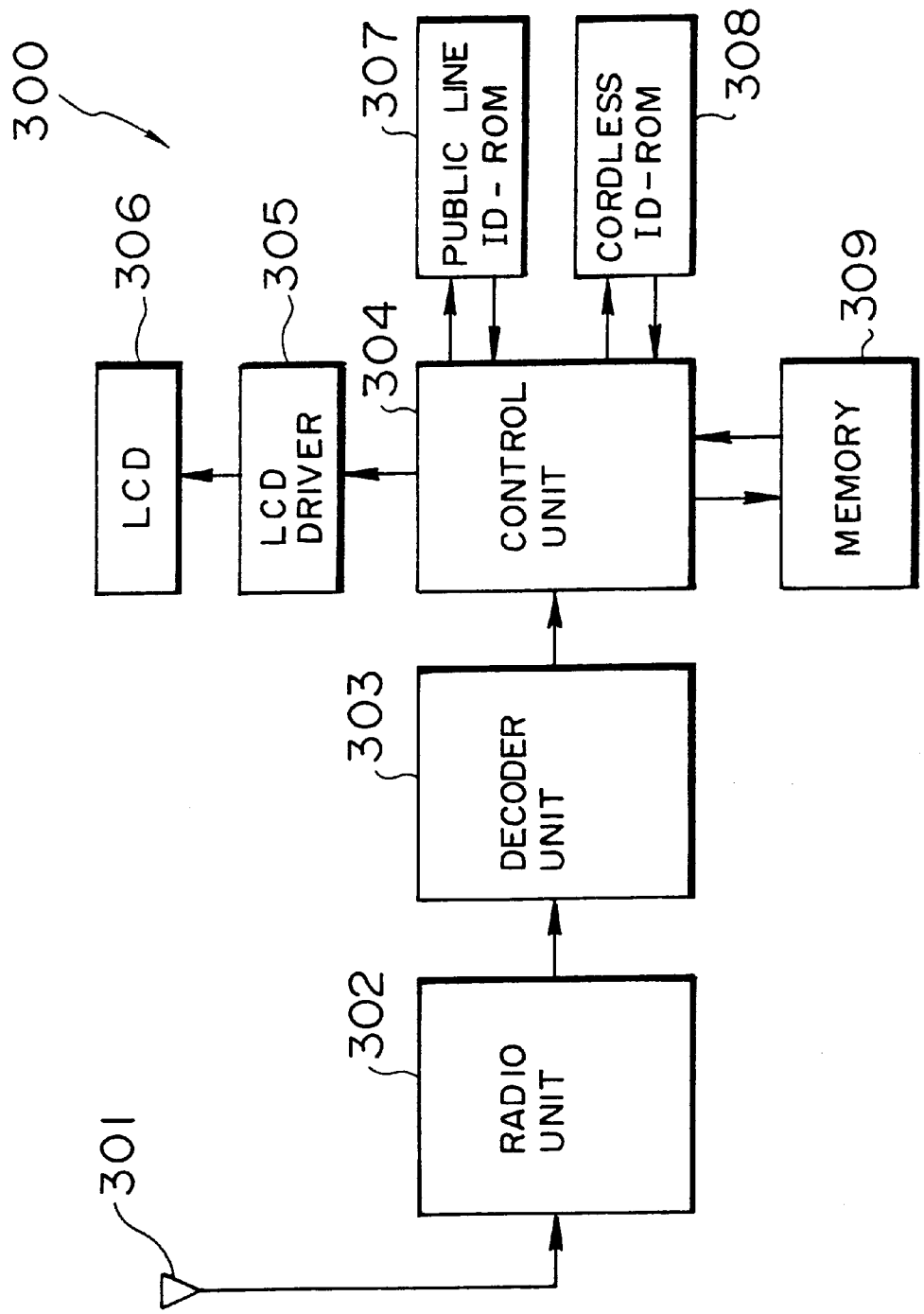
FIG. 5 is a block diagram showing an example of the internal arrangement of a pager of the present invention.

A master unit 100 comprises an antenna 101 for transmitting/receiving a radio signal to/from a cordless telephone subsidiary unit 200 shown in FIG. 4, a cordless telephone radio unit 112 for modulating/demodulating the radio signal transmitted/received to/from the cordless telephone subsidiary unit 200, an antenna 102 for transmitting a selective call number to a pager 300 shown in FIG. 5, a pager signal transmission unit 103 for modulating the selective call signal to be transmitted to the pager 300, a control unit 104 for controlling pager call processing, an LCD driver 105 for controlling display on an LCD 106, a memory 107 for temporarily storing various information such as the selective call number to be transmitted, a cordless ID-ROM 108 storing the selective call number used to call the pager 300 from the master unit 100, a speech input/output driver 109 for controlling a loudspeaker 110 and a microphone 111, a public line connection interface unit 113 for connecting the master unit 100 to a public telephone line, and a pager calling switch 114 depressed when the user calls the pager 300 from the master unit 100.

The LCD 106 is used for displaying various information such as telephone numbers. The loudspeaker 110 is arranged at the receiver of the master unit 100 to perform speech communication. The microphone 111 is arranged at the transmitter of the master unit 100 to perform speech communication.

FIG. 4 is a block diagram showing an example of the internal arrangement of the cordless telephone subsidiary unit 200 of the present invention.

The subsidiary unit 200 comprises an antenna 201 for transmitting/receiving a radio signal to/from the cordless telephone master unit 100, a cordless telephone radio unit 212 for modulating/demodulating the radio signal transmitted/received to/from the cordless telephone master unit 100, an antenna 202 for transmitting a selective call signal to the pager 300 shown in FIG. 5, a pager signal transmission unit 203 for modulating the selective call signal to be transmitted to the pager 300, a control unit 204 for controlling pager call processing, an LCD driver 205 for controlling display on an LCD 206, a memory 207 for temporarily storing various information such as the selective call signal to be transmitted, a cordless ID-ROM 208 storing the selective call number used to call the pager 300 from the subsidiary unit 200, a speech input/output driver 209 for controlling a loudspeaker 210 and a microphone 211, and a pager calling switch 213 depressed when the user calls the pager 300 from the subsidiary unit 200.

The LCD 206 Is used for displaying various information such as telephone numbers. The loudspeaker 210 is arranged at the receiver of the master unit 200 to perform speech communication. The microphone 211 arranged at the transmitter of the master unit 200 to perform speech communication.

FIG. 5 is a block diagram showing an example of the internal arrangement of the pager 300 of the present invention.

The pager 300 comprises an antenna unit 301 for receiving both a selective call signal from the general public telephone line and a selective call signal from the cordless telephone (the master unit 100 and the subsidiary unit 200), a radio unit 302 for demodulating the signal received by the antenna unit 301, a decoder unit 303 for digitizing the signal from the radio unit 302 and outputting the obtained digital signal, a control unit 304 for performing determination processing of a selective call number included in the signal from the decoder unit 303, an LCD driver 305 for controlling display on an LCD 306, the LCD 306 for displaying a message included in the signal from the decoder unit 303, a public line ID-ROM 307 storing the selective call number of the pager, which is used to call the pager from the general public telephone line, a cordless ID-ROM 308 storing the selective call number of the pager, which is used to call the pager from the master unit 100 or the subsidiary unit 200, and a memory 309 for temporarily storing various information such as the signal from the decoder unit 303.

Figure 6:
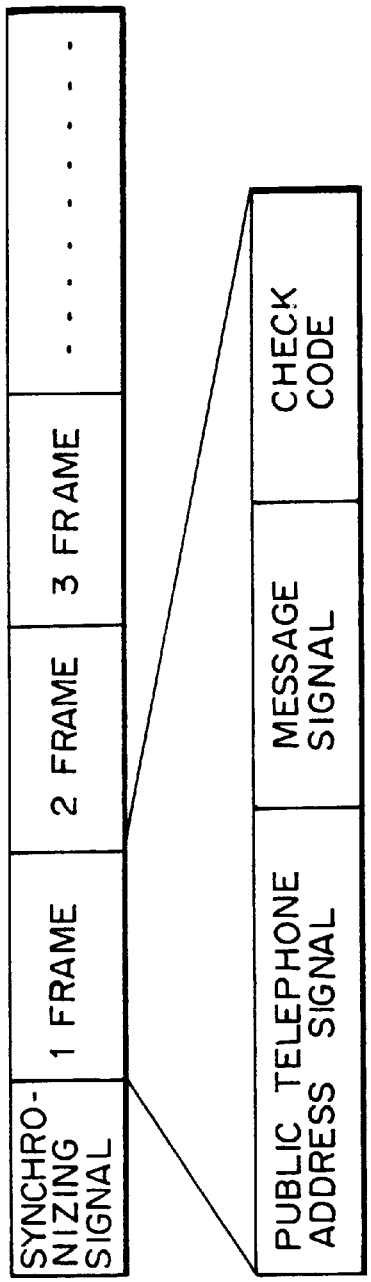
FIG. 6 is a view showing an example of the format of a selective call signal from a general public telephone line.
Figure 7:
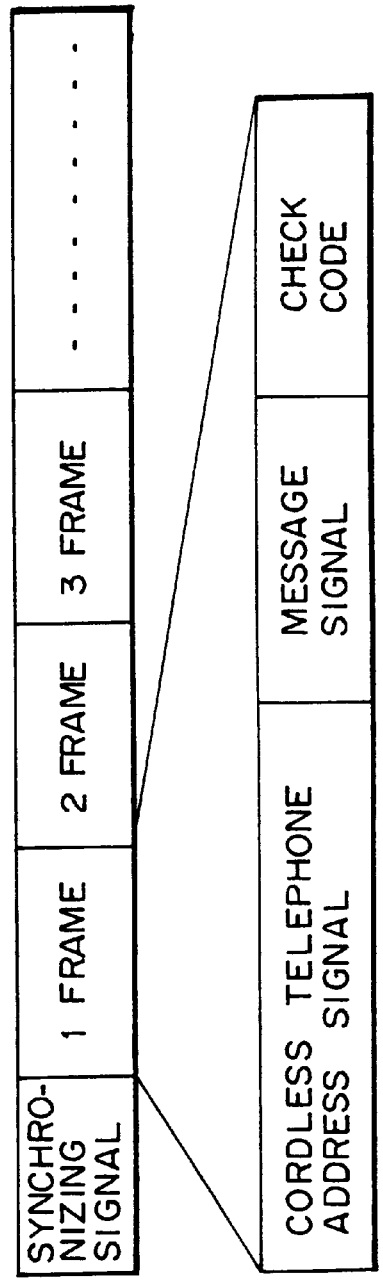
FIG. 7 is a view showing an example of the format of a selective call signal from a cordless telephone.

FIG. 6 illustrating an example of the format of the selective call signal from the general public telephone line. FIG. 7 depicts an example of the format of the selective signal from the cordless telephone.

As is apparent from FIGS. 6 and 7, the selective call signal comprises a plurality of frames subsequent to a synchronizing signal. Each frame includes an address number as the selective call number of the pager 300, a message signal as a message from the caller, and a check code used to check a transmission error and the like.

An operation performed to call the pager from the cordless telephone and an operation performed to call the pager from the general public telephone line will be described below.

Figure 8:
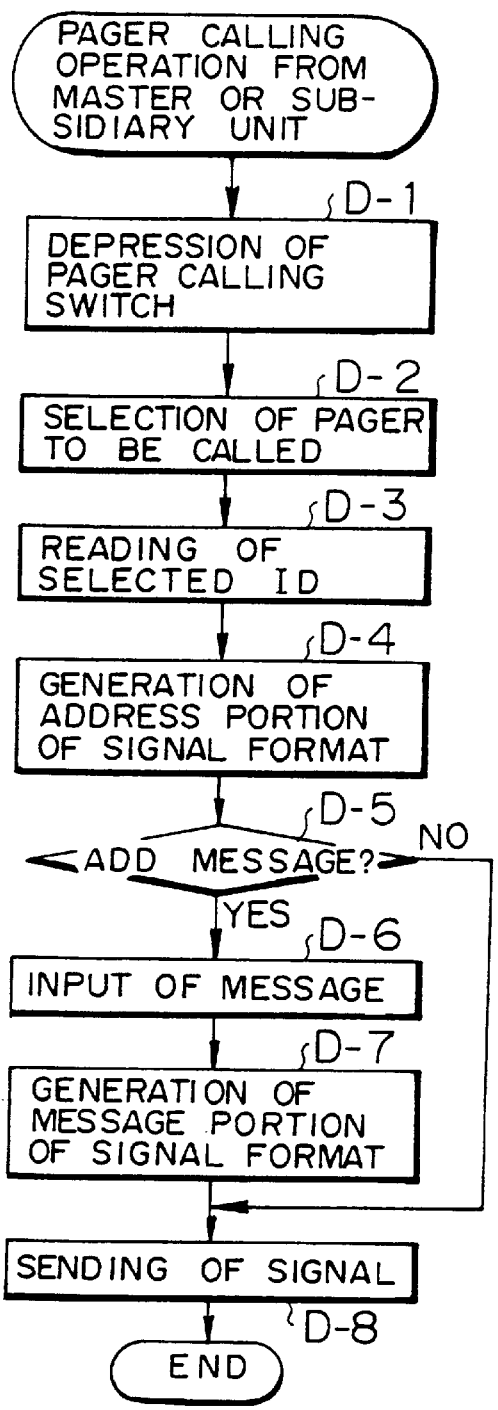
FIG. 8 is a flow chart of selective call signal transmission processing in the cordless telephone master unit shown in FIG. 3 and the cordless telephone subsidiary unit shown in FIG. 4.

FIG. 8 is a flow chart of selective call signal transmission processing in the cordless telephone master unit 100 shown in FIG. 3 and the cordless telephone subsidiary unit 200 shown in FIG. 4.

Selective call signal transmission processing in the master unit 100 is the same as that in the subsidiary unit 200, and selective call signal transmission processing in the master unit 100 will be described below with reference to FIG. 3.

First, the user of the master unit 100 depresses the pager calling switch 114 step (D-1) and selects a target call pager through an input operating unit (not shown) (D-2).

The control unit 104 reads out a selective call number corresponding to the pager selected in step D-2 from the cordless ID-ROM 108 (D-3) and generates an address portion in the format shown in FIG. 7 (D-4).

The user of the master unit 100 can cause the pager to display a desired message upon calling the pager 300. When the user inputs this message (D-5 and D-6), the control unit 104 generates a message portion in the format shown in FIG. 7 (D-7). The master unit 100 transmits the generated selective call signal through the pager signal transmission unit 103 and the antenna 102.

Figure 9:
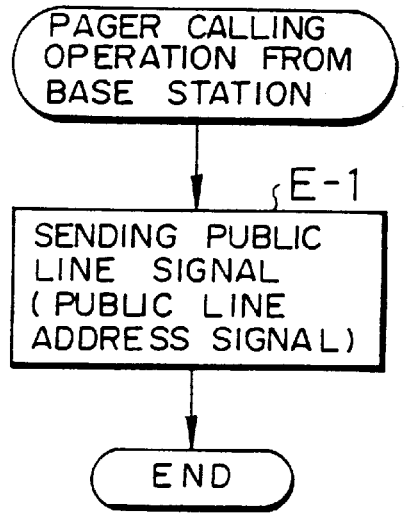
FIG. 9 is a flow chart of selective call signal transmission processing that is conventionally performed when the general public telephone line is used.

FIG. 9 is a flow chart showing selective call signal transmission processing performed when the general public telephone line is used.

This processing is the same as that of the conventional system shown in FIG. 1, and a detailed description thereof will be omitted. The paging system base station 5 shown in FIG. 1 transmits a selective call signal including a selective call number corresponding to a target call pager (step E-1).

Figure 10:
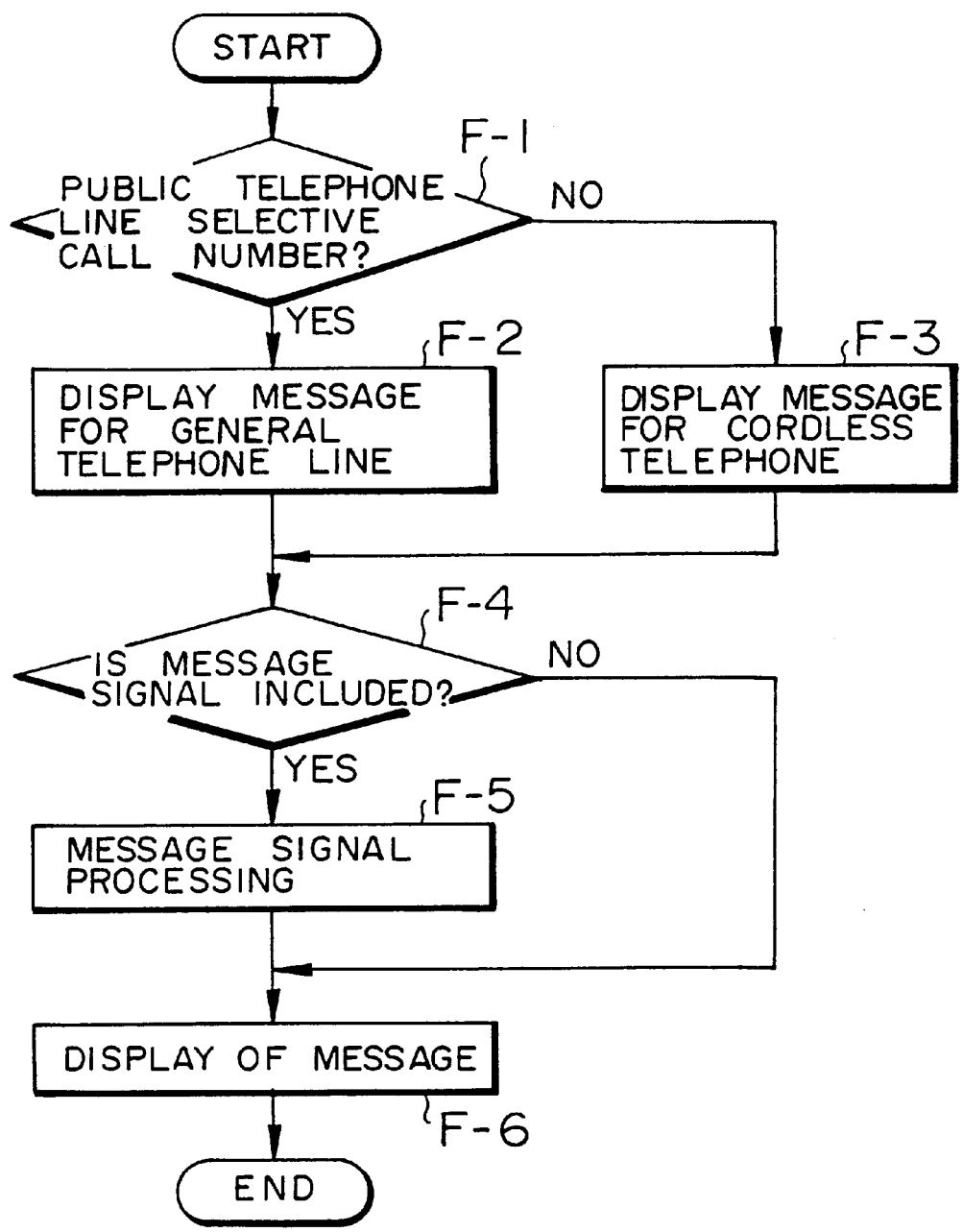
FIG. 10 is a flow chart of selective call signal reception processing in the pager shown in FIG. 5.

FIG. 10 is a flow chart of selective call signal reception processing in the pager 300 shown in FIG. 5.

Upon receiving a selective call signal including the selective call number assigned to the pager, the pager 300 compares the selective call number included in the signal received by the antenna unit 301 with the selective call numbers read out from the public line ID-ROM 307 and the cordless ID-ROM 308, thereby determining whether the selective call number included in the signal received by the antenna unit 301 corresponds to the general public telephone line or the cordless telephone step (F-1). If the selective call number corresponds to the general public telephone line, a message for the general public telephone line (e.g., a message representing a call through the general public telephone line) is displayed on the LCD 306 (F-2). Otherwise, a message for the cordless telephone (e.g., a message representing a call from the cordless telephone) is displayed on the LCD 306 (F-3).

Subsequently, it is determined whether a message is included in the signal received by the antenna unit 301 (F-4). If a message is included, message signal processing is performed (F-5) to display the message (F-6), thereby ending the processing. If it is determined in step (F-4) that no message is included, a message representing that no message is included in the selective call signal is displayed (F-6), thereby ending the processing.

As has been described above, according to the present invention, the user can always call the radio selective calling receiver when it is within the range of several hundred meters from the cordless telephone master or subsidiary unit without using the general public telephone line and without being charged for the call. With this arrangement, even in a room far from the telephone or even outside close to the house, where no ringing of the telephone reaches directly, reception of an incoming call can be detected. In addition, the radio selective calling receiver is much lighter-in weight than the cordless telephone subsidiary unit. Therefore, the user can easily and always carry the receiver to obtain the information.

What we claim is:

1. A paging system comprising:
   a radio selective calling receiver having a receiving unit which is responsive to signals in a paging frequency band, said signals being transmitted to said radio selective calling receiver from a cordless telephone master unit or subsidiary unit in said paging frequency band without using a general public telephone line, said receiving unit also being responsive to signals in said paging frequency band which are initiated through said general public telephone line; and
   said cordless telephone master unit and base unit being capable of transmitting said signals in said paging frequency band to said receiver.

2. A system according to claim 1, wherein said cordless telephone master unit and said subsidiary unit can transmit a selective call number different from that transmitted from said general public telephone line by using the same frequency band as that of said general public telephone line.

3. The system as recited in claim 1, wherein said receiver has a display which indicates whether a received signal is from said public line or from said cordless telephone.

4. A system according to claim 1, wherein said radio selective calling receiver has two selective call numbers including a selective call number used to receive a signal transmitted from a general public telephone line and a selective call number used to receive a signal transmitted from said cordless telephone master unit or subsidiary unit.

5. The system as recited in claim 4, wherein said receiver has a display which indicates whether a received signal is from said public line or from said cordless telephone.

6. The system as recited in claim 4, wherein said public line number and said cordless telephone number are stored in respective memories in said receiver.

7. The system as recited in claim 6, wherein said receiver has a display which indicates whether a received signal is from said public line or from said cordless telephone.

* * * * *